United States Patent [19]

Kono et al.

[11] Patent Number: 4,600,633

[45] Date of Patent: Jul. 15, 1986

[54] POLYETHYLENE SUPERTHIN FILM AND A PROCESS FOR THE PRODUCTION OF THE SAME

[75] Inventors: Koichi Kono; Shoichi Mori; Kenji Miyasaka; Jyoichi Tabuchi, all of Iruma, Japan

[73] Assignee: Toa Nenryo Kogyo Kabushiki Kaisha, Tokyo, Japan

[21] Appl. No.: 728,803

[22] Filed: Apr. 29, 1985

[30] Foreign Application Priority Data

Apr. 27, 1984 [JP] Japan .................................. 59-83873

[51] Int. Cl.$^4$ ...................... B29C 41/12; B29C 43/22; B29K 23/00; B29L 7/00
[52] U.S. Cl. .................................... 428/220; 264/204; 264/212; 428/339; 428/523
[58] Field of Search ................ 428/220, 339; 264/204, 264/212

[56] References Cited

U.S. PATENT DOCUMENTS 3,865,674 2/1975 Duling et al. .................. 428/220
3,933,561 1/1976 Larson et al. .................. 264/212

FOREIGN PATENT DOCUMENTS 1008212 10/1965 United Kingdom ................ 264/212

*Primary Examiner*—Allan M. Lieberman
*Attorney, Agent, or Firm*—Wenderoth, Lind & Ponack

[57] ABSTRACT

A polyethylene superthin film having a thickness of at most 3 μm, a tensile modulus of at least 2000 kg/cm$^2$, a breaking strength of at least 500 kg/cm$^2$ and a haze of at most 10% is produced by heating and dissolving polyethylene having a weight average molecular weight of at least $5 \times 10^5$ in a solvent, forming a gel sheet from the resulting solution, subjecting the gel sheet to a solvent removal treatment to adjust the amount of the solvent in the gel sheet to 10 to 80% by weight, heating and stretching the sheet, removing the residual solvent therefrom and then subjecting the stretched product to a compressing treatment at a temperature of at most the melting point of the polyethylene.

14 Claims, No Drawings

POLYETHYLENE SUPERTHIN FILM AND A PROCESS FOR THE PRODUCTION OF THE SAME

BACKGROUND OF THE INVENTION

1. Field of the Invention

This invention relates to an extremely thin film of polyethylene and more particularly, it is concerned with a transparent and extremely thin film of ultrahigh molecular weight polyethylene excellent in tensile modulus as well as breaking strength. The term "extremely thin" will hereinafter be referred to as "superthin" in this specification.

2. Description of the Prior Art

The general features of polyethylene consist in being excellent in chemical resistance, electrical insulation and moldability and not brittle even at low temperatures and films obtained therefrom have widely been used as various packing materials and electrical insulating materials. For the electrical insulating materials, e.g. condensers, above all, thinner and higher strength films have lately been required. In the case of making thinner a polyethylene film having an ordinary molecular weight, for example, less than 500,000, however, the thickness obtained is limited to approximately 10 $\mu$m and when the polyethylene film is further made thinner than this thickness, it is not resistant to the tension during stretching and often broken. On the other hand, ultrahigh molecular weight polyethylene is expected to have a higher strength and higher elasticity even in the form of a superthin film, but in actual fact, it has a worse stretchability because of more remarkable interlacement of the molecular chains than the ordinary molecular weight polyethylene. In order to improve this stretchability, for example, there has been proposed a method comprising dissolving ultrahigh molecular weight polyethylene in paraffin oil, forming a gel film from this solution, and then heating and stretching the gel containing the solvent or dry gel from which the solvent has been extracted with a volatile solvent, as described in Japanese Patent Application OPI (Kokai) No. 5228/1983.

However, the gel film of ultrahigh molecular weight polyethylene has a continuous and porous network structure swelled highly with a non-volatile solvent, so stretching it in two directions as it is results in that a high orientation stretching is impossible, the meshes of the network is enlarged to cause a tendency of breakage and a high ratio stretching is so difficult that making the film thinner is unfavourably carried out. When the gel film of ultrahigh molecular weight polyethylene containing the solvent is dried by substitution thereof with a volatile solvent, the porous network structure in the gel film is not capable of self-supporting and shrinks to be compacted. Uniform evaporation of the solvent in the gel film is difficult, the dried film bends and a high ratio stretching is impossible due to shrinking and compacting in the production of a superthin film.

SUMMARY OF THE INVENTION

It is an object of the present invention to provide a transparent superthin film of ultrahigh molecular weight polyethylene with an excellent tensile modulus and breaking strength.

It is another object of the present invention to provide a process for the production of a transparent superthin film of ultrahigh molecular weight polyethylene by overcoming the above described disadvantages of the prior art.

These objects can be attained by (1) a polyethylene superthin film consisting of polyethylene having a weight average molecular weight of at least $5 \times 10^5$, and having a thickness of at most 3 $\mu$m, preferably 0.05 to 3 $\mu$m, more preferably 0.1 to 1 $\mu$m, a tensile modulus of at least 2000 kg/cm$^2$, preferably at least 4000 kg/cm$^2$, a breaking strength of at least 500 kg/cm$^2$, preferably at least 1000 kg/cm$^2$ and a haze of at most 10%, preferably at most 5%, and (2) a process for the production of a polyethylene superthin film having a thickness of at most 3 $\mu$m, preferably 0.05 to 3 $\mu$m, a tensile modulus of at least 2000 kg/cm$^2$, a breaking strength of at least 500 kg/cm$^2$ and a haze of at most 10%, which comprises heating and dissolving polyethylene having a weight average molecular weight of at least $5 \times 10^5$ in a solvent, forming a gel sheet from the resulting solution, subjecting the gel sheet to a solvent removal treatment to adjust the amount of the solvent in the gel sheet to 10 to 80% by weight, heating and stretching the sheet, removing the residual solvent and then subjecting the stretched film to a compressing treatment at a temperature of at most the melting point of the polyethylene.

DETAILED DESCRIPTION OF THE INVENTION

The process for producing a polyethylene superthin film according to the present invention will now be illustrated in detail.

The polyethylene used in the present invention is a crystalline polyethylene of ultrahigh molecular weight, consisting of homopolymer of ethylene or a copolymer of ethylene with at most 10 mol % of one or more $\alpha$-olefins. The weight average molecular weight should be at least $5 \times 10^5$, preferably $5 \times 10^5$ to $15 \times 10^6$, more preferably $1 \times 10^6$ to $10 \times 10^6$. When using a polyethylene with a weight average molecular weight of less than $5 \times 10^5$, a superthin film of a higher elasticity and higher strength cannot be obtained according to the present invention.

The polyethylene solution used as a raw material in the present invention is prepared by heating and dissolving the above described polyethylene having a weight average molecular weight of at least $5 \times 10^5$ in a solvent. As this solvent, there can be used any solvents capable of dissolving the polyethylene sufficiently, for example, aliphatic or cyclic hydrocarbons such as nonane, decane, undecane, dodecane, decalin and paraffin oils or mineral oil fractions having boiling points corresponding thereto. For the purpose of obtaining a gel sheet whose solvent content is stable, non-volatile solvents such as paraffin oils are preferable. The heating and dissolving is generally carried out with agitation at a temperature at which the polyethylene is completely dissolved in the solvent. The temperature, depending upon the variety of the solvent used, ranges generally 140° to 250° C. The concentration of the polyethylene solution is preferably 1 to 10% by weight. Furthermore, it is preferable to add an antioxidant so as to prevent the polyethylene from deterioration due to oxidation during the heating and dissolving.

The heated polyethylene solution is then extruded from a suitably selected die in the form of a sheet or flowed and spread on a support and cooled at a rate of at least 50° C./min to a temperature of at most the gelling temperature, preferably 15° to 25° C. using a water bath, air bath or solvent for the purpose of gelling. The gel sheet is generally formed in a thickness of 0.1 to 5 mm. This gel sheet is swelled with the solvent used for dissolving the polyethylene and accordingly, requires a solvent removal treatment.

The solvent removal treatment is generally carried out by immersing the gel sheet in a readily volatile solvent, extracting the residual solvent and drying, by compressing, by heating or by combining two or more of these methods, but above all, the method of extracting with a readily volatile solvent is preferable wherein the solvent can be removed without marked deformation of the structure of the gel sheet. As the readily volatile solvent, there can be used hydrocarbons such as pentane, hexane, heptane and the like; chlorinated hydrocarbons such as methylene chloride, carbon tetrachloride and the like; fluorinated hydrocarbons such as ethylene trifluoride; ethers such as diethyl ether, dioxane and the like; and alcohols such as methanol, ethanol, propanol and the like. These solvents are suitably chosen depending upon the solvent used for dissolving the polyethylene and can be used individually or in combination.

The amount of the solvent removed from the gel sheet should so be adjusted that the amount of the solvent remaining in the gel sheet is 10 to 80% by weight, preferably 40 to 80% by weight, since if less than 10% by weight, compacting of the network structure of the gel sheet excessively proceeds and stretching cannot be carried out with a high ratio, resulting in a difficulty in obtaining a superthin film with a higher elasticity and higher strength, while if more than 80% by weight, the gel sheet is so excessively swelled that a high orientation stretching cannot be carried out, breakage tends to occur and the resulting superthin film has only a lower strength. The amount of the solvent in the gel sheet can be controlled by the amount of a readily volatile solvent to be contacted with the gel sheet or the pressure during compressing.

In the solvent removal treatment of the gel sheet with a readily volatile solvent, the gel sheet shrinks and bends in three axial directions with evaporation of the readily volatile solvent replaced in the gel sheet. Therefore, in order to prevent this phenomenon and obtain a base stock sheet having smoothness and a smaller shrinkage in two directions (longitudinal, lateral) which can be stretched uniformly with a high ratio, it is preferable to allow the gel sheet to shrink selectively in the thickness direction. Preferably the shrinkage is at least 50%, more preferably at least 70% in the thickness direction and at most 20% in the two directions. The shrinkage of the gel sheet selectively in the thickness direction can be accomplished, for example, by evaporating the readily volatile solvent while contacting the gel sheet tightly with a support, holding it from the two directions or holding it between porous plates.

The stretching is carried out biaxially with a predetermined ratio by heating the base stock sheet of the gel sheet subjected to the solvent removal treatment and stretching biaxially using the ordinary tenter method, roll method, compressing method or these methods in combination. The biaxial stretching can either be carried out simultaneously or in sequence.

The heating temperature is preferably in the range of from the α-dispersion temperature to the crystal melting point of the polyethylene of the raw sheet, particularly 90° to 140° C., more particularly 110° to 130° C. If the heating temperature is lower than the crystal dispersion point, softening of the resin is insufficient so that the sheet tends to be broken during stretching and the stretching cannot be carried out with a higher ratio, while if higher than the crystal melting point, the sheet is too melted to be stretched.

The stretching ratio or magnification, depending upon the thickness of the base stock sheet, is at least 2, preferably at least 5 in one direction and at least 10, preferably at least 25 in the surface direction. If the surface ratio is less than 10, a film with a higher elasticity and higher strength cannot be obtained.

The stretched product is immersed in the above described readily volatile solvent to extract and remove the residual solvent and then subjected to evaporation of the solvent and dried. The extraction of the solvent should be carried out in such a manner that the solvent content in the stretched product be less than 1% by weight.

Since the stretched product, from which the residual solvent has thus been removed, has pores and is opaque, it should be subjected to a compressing treatment at a temperature of at most the melting point of the polyethylene. Specifically, the compressing treatment is carried out at a temperature of 80° to 140° C. using a press or roll. If the temperature during the compressing treatment exceeds the melting point, heat shrinkage occur in the stretched product, while if lower than 80° C., the stretched product cannot be freed from pores and a superthin film with a higher elasticity and higher strength cannot be obtained.

Therefore, the present invention provides a polyethylene superthin film which has a thickness of 0.05 to 3 μm, a tensile modulus of at least 2000 kg/cm$^2$, a breaking strength of at least 500 kg/cm$^2$ and a haze of at most 10% and which is substantially free from pores, that is, a polyethylene superthin film whose thickness, elasticity, strength and transparency cannot be obtained in the prior art processes. The polyethylene superthin film of the present invention is available for various uses, for example, packing materials and electrical insulating materials, in particular, film condensers, because of its extremely thin thickness, higher elasticity and higher strength.

The following examples are given in order to illustrate the present invention in detail without limiting the same, in which the following test methods are used:

(1) Film Thickness: Measurement of cross section of film using scanning electron microscope
(2) Tensile Modulus: According to ASTM D 882
(3) Breaking Strength: According to ASTM D 882
(4) Elongation at Breaking: According to ASTM D 882
(5) Haze: According to JIS K6714

EXAMPLE 1

To 100 parts by weight of a mixture of liquid paraffin (64 cst/40° C.) containing 4.0% by weight of polyethylene having a weight average molecular weight ($\overline{Mw}$) of $2 \times 10^6$ were added 0.125 part by weight of 2,6-di-t-butyl-p-cresol and 0.25 part by weight of tetrakis(-methylene-3-(3,5-di-t-butyl-4-hydroxyphenyl)-propionate)methane, as antioxidants and mixed. The resulting mixed solution was charged in an autoclave equipped with a stirrer and heated at 200° C. with agitation for 90 minutes to form a homogeneous solution.

This solution was charged in a heated metal mold, rapidly cooled to 15° C. and formed into a gel sheet with a thickness of 2 mm. This gel sheet was immersed in 1000 ml of methylene chloride for 60 minutes, and then subjected to evaporation of the methylene chloride while putting it on a smooth plate, thus obtaining a base stock sheet containing 20.3% by weight of liquid paraffin and having a shrinkage of 94.5% in the thickness direction.

The resulting base stock sheet was cut in a size of 9×9 cm, set in a biaxial stretching machine and then subjected to simultaneous biaxial stretching at a temperature of 130° C., rate of 30 cm/min and stretching ratio (magnification) of 5×5. The stretched sheet was washed with methylene chloride to extract and remove the residual liquid paraffin and then dried to obtain a stretched product with a thickness of 5.6 μm.

The thus stretched product was pressed at 120° C. under 200 kg/cm$^2$G for 10 minutes, thus obtaining a polyetylene superthin film having properties shown in Table 1.

EXAMPLES 2-6

The procedure of Example 1 was repeated except that the gel sheet obtained in Example 1 was formed under forming conditions shown in Table 1, thus obtaining films having properties shown in Table 1.

EXAMPLE 7

The procedure of Example 1 was repeated except that a gel sheet with a thickness of 1 mm was obtained in Example 1 and formed under forming conditions shown in Table 1, thus obtaining a film having properties shown in Table 1.

EXAMPLES 8 AND 9

The procedure of Example 1 was repeated except that the gel sheet obtained in Example 1 was rolled to remove partly the liquid paraffin, immersed in methylene chloride to remove the solvent and then formed under forming conditions shown in Table 1, thus obtaining films having properties shown in Table 1.

EXAMPLE 10

The procedure of Example 1 was repeated except that the concentration of the polyethylene solution was adjusted to 2.0% by weight and the forming was carried out as shown in Table 1, thus obtaining a film having properties shown in Table 1.

EXAMPLE 11

The procedure of Example 1 was repeated except that the gel sheet obtained in Example 1 was stretched biaxially in sequence under conditions shown in Table 1 to obtain a film with properties shown in Table 1.

COMPARATIVE EXAMPLES 1 AND 2

The procedure of Example 1 was repeated except that the amount of the liquid paraffin in the gel sheet obtained in Example 1 was adjusted to 8.1% by weight or 87.0% by weight and the forming was carried out under conditions shown in Table 1, thus obtaining films shown in Table 1.

COMPARATIVE EXAMPLE 3

The procedure of Example 1 was repeated except forming a gel sheet by the use of a solution of 16% by weight of polyethylene with an ordinary molecular weight ($\overline{Mw}$ 13.5×10$^4$) in liquid paraffin instead of the ultrahigh molecular weight polyethylene of Example 1 and effecting the forming or stretching under conditions shown in Table 1. However, the film was broken in the stretching with a higher magnification and no superthin film was obtained.

COMPARATIVE EXAMPLE 4

When the stretched product, from which the residual liquid paraffin had been removed, was subjected to a pressing treatment at 150° C., the film shrank and no superthin was obtained.

TABLE 1

| | Film Forming Conditions | | | | | Properties of Polyethylene Superthin Film | | | | |
|---|---|---|---|---|---|---|---|---|---|---|
| | Solvent in Gel Sheet (wt %) | Shrinkage of Gel Sheet in Thickness Direction (%) | Stretching Temperature (°C.) | Stretching Ratio | Temperature in Compressing Treatment (°C.) | Thickness of Film (μm) | Tensile Modulus (kg/cm$^2$) | Breaking Strength (kg/cm$^2$) | Elongation at Breaking (%) | Haze (%) |
| Example | | | | | | | | | | |
| 1 | 20.3 | 94.5 | 130 | 5 × 3 | 120 | 2.7 | 2400 | 700 | 634 | 4.6 |
| 2 | 67.2 | 84.5 | 130 | 7 × 7 | 120 | 1.6 | 4000 | 1140 | 448 | 9.8 |
| 3 | 67.2 | 81.5 | 130 | 9 × 9 | 120 | 0.9 | 5300 | 1400 | 460 | 3.0 |
| 4 | 78.0 | 80.0 | 120 | 10 × 10 | 100 | 0.9 | 18540 | 3960 | 29.6 | 3.2 |
| 5 | 62.2 | 81.2 | 125 | 10 × 10 | 100 | 1.2 | 10950 | 3800 | 58.8 | 5.1 |
| 6 | 68.0 | 85.0 | 130 | 10 × 10 | 100 | 0.3 | 6120 | 1060 | 30.0 | 2.9 |
| 7 | 62.0 | 81.2 | 120 | 10 × 10 | 100 | 0.7 | 10680 | 3890 | 50.0 | 3.8 |
| 8 | 46.3 | 89.2 | 130 | 10 × 10 | 100 | 0.4 | 5720 | 1720 | 40.1 | 3.8 |
| 9 | 40.5 | 90.1 | 130 | 10 × 10 | 100 | 0.4 | 7120 | 1260 | 29.1 | 3.2 |
| 10 | 59.0 | 85.0 | 120 | 10 × 10 | 100 | 0.5 | 9180 | 3070 | 42.3 | 2.8 |
| 11 | 62.0 | 81.2 | 125 | 10 × 10 | | 1.1 | 13090* | 3950* | 31.9* | 4.5 |
| | | | | | | | 5550** | 2330** | 62.0** | |
| Comparison | | | | | | | | | | |
| 1 | 8.1 | 95.6 | 130 | 5 × 5 (broken) | — | — | — | — | — | — |
| 2 | 87.0 | 80.0 | 130 | 10 × 10 | 100 | 0.6 | 352 | 251 | 865 | 5.6 |
| 3 | 47.2 | 82.5 | 130 | 5 × 5 (broken) | — | — | — | — | — | — |
| 4 | 62.2 | 81.2 | 120 | 10 × 10 | 150 (shrinkage) | — | — | — | — | — |

Note:
*longitudinal
**lateral

What is claimed is:

1. A polyethylene superthin film consisting of polyethylene having a weight average molecular weight of at least $5 \times 10^5$, and having a thickness of at most 3 μm, a tensile modulus of at least 2000 kg/cm$^2$, a breaking strength of at least 500 kg/cm$^2$ and a haze of at most 10%.

2. The polyethylene superthin film of claim 1, wherein the thickness is 0.1 to 1 μm, the tensile modulus is at least 4000 kg/cm$^2$, the breaking strength is at least 1000 kg/cm$^2$ and the haze is at most 5%.

3. The polyethylene superthin film of claim 1, wherein the weight average molecular weight is $1 \times 10^6$ to $10 \times 10^6$.

4. A process for the production of a polyethylene superthin film having a thickness of at most 3 μm, a tensile modulus of at least 2000 kg/cm$^2$, a breaking strength of at least 500 kg/cm$^2$ and a haze of at most 10%, which comprises heating and dissolving polyethylene having a weight average molecular weight of at least $5 \times 10^5$ in a solvent with sufficient agitation to ensure the complete dissolution of the polyethylene in the solvent, forming a gel sheet from the resulting solution by subjecting the polyethylene solution to extrusion through a die or to spreading over a support, and cooling and gelling at a temperature below the gelling temperature and at a cooling rate of at least 50° C./min., subjecting the gel sheet to a solvent removal treatment to adjust the amount of the solvent in the gel sheet to 10 to 80% by weight, heating and stretching the sheet biaxially simultaneously or in sequence at a temperature of from the α-dispersion point to the crystal melting point of the polyethylene with a surface magnification of at least 10 times, removing the residual solvent therefrom and then subjecting the stretched product to a compressing treatment at a temperature of 80° to 140° C. using a press or roll.

5. The process of claim 4, wherein the weight average molecular weight is $1 \times 10^6$ to $10 \times 10^6$.

6. The process of claim 4, wherein the solvent is at least one member selected from the group consisting of aliphatic hydrocarbons and cyclic hydrocarbons such as nonane, decane, undecane, dodecane, decalin and paraffin oils and mineral oil fractions having boiling points corresponding thereto.

7. The process of claim 6, wherein the solvent is a non-volatile solvent such as a paraffin oil.

8. The process of claim 4, wherein the heating and dissolving is carried out at a temperature of 140° to 250° C.

9. The process of claim 4, wherein the solution has a polyethylene content of 1 to 10% by weight.

10. The process of claim 4, wherein the temperature is 15° to 25° C.

11. The process of claim 4, wherein the solvent removal treatment is carried out by immersing the gel sheet in a readily volatile solvent to extract the solvent.

12. The process of claim 12, wherein the readily volatile solvent is at least one member selected from the group consisting of hydrocarbons such as pentane, hexane and heptane, chlorinated hydrocarbons such as methylene chloride and carbon tetrachloride, fluorinated hydrocarbons such as trifluoroethane, ethers as diethyl ether and dioxane and alcohols such as methanol, ethanol and propanol.

13. The process of claim 4, wherein the solvent removal treatment is carried out in such a manner that the gel sheet shrinks with a shrinkage of at least 50% in the thickness direction and at most 20% in the longitudinal and lateral directions.

14. The process of claim 4, wherein the temperature is 90° to 140° C.

* * * * *